W. CHESTERMAN.
Coffee Pot.
No. 26,889.
Patented Jan'y 24, 1860.
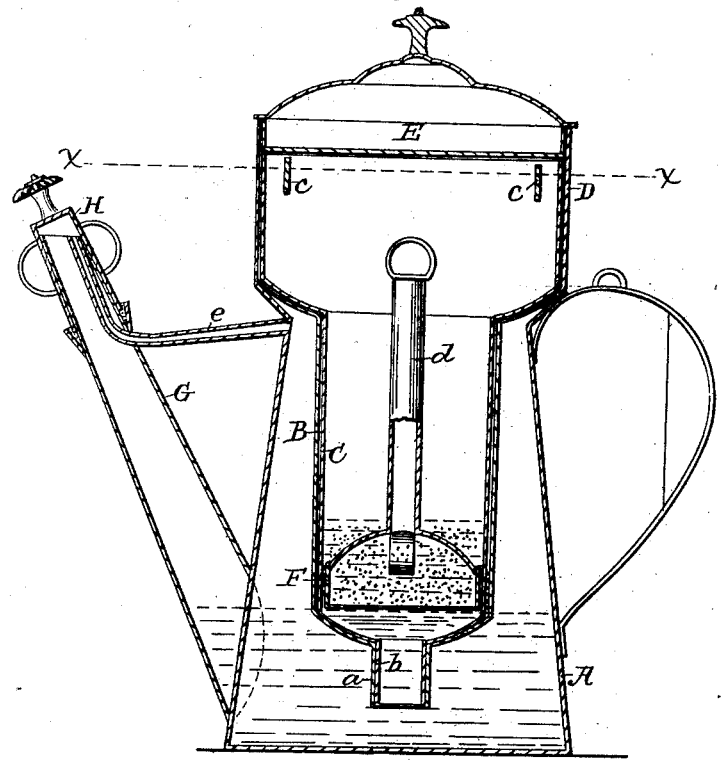
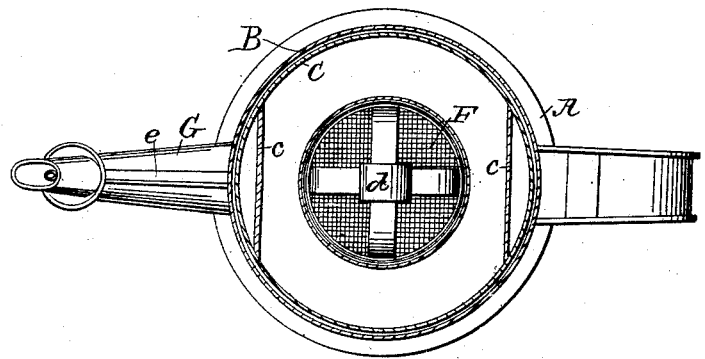
Witnesses
Inventor
William Chesterman

UNITED STATES PATENT OFFICE.

WILLIAM CHESTERMAN, OF CENTRALIA, IOWA.

COFFEE-POT.

Specification of Letters Patent No. 26,889, dated January 24, 1860.

*To all whom it may concern:*

Be it known that I, WILLIAM CHESTERMAN, of Centralia, in the county of Dubuque and State of Iowa, have invented a new and Improved Coffee-Pot; and I do hereby declare that the following is a full, clear, and exact description of the same, reference being had to the accompanying drawings, forming a part of this specification, in which—

Figure 1, represents a vertical central section of my invention, and Fig. 2, is a horizontal section of ditto, taken in the plane indicated by the line $x, x$, Fig. 1.

Similar letters in both views indicate corresponding parts.

This invention consists in certain improvements on a coffee pot for which Letters Patent were granted to me bearing date July 19th, 1859.

In order to be able to take out the grindings from my pot without danger of mixing some of it with the liquid coffee I have now arranged the piston packed strainer in a separate movable cylinder which fits into the new or stationary cylinder of the pot so that the strainer forms an adjustable bottom of said movable cylinder and that in removing this cylinder the strainer together with the grindings is taken out at the same time. I have also arranged an air tube in my new pot in such a manner that the cap of the spout covers both the spout and the air tube and that in taking off said cap the mouth of the air tube is also opened so that the air is admitted to the pot whenever it is needed.

To enable those skilled in the art to make and use my invention I will proceed to describe it.

The form of my new pot A, resembles that of a common coffee-pot, and I have now arranged in this pot and rigidly attached to the same a stationary cylinder B, which extends down to near the bottom of the same. Its lower end is contracted forming a tube $a$, which together with the wider part of the cylinder B, forms a guide for the movable cylinder C. The upper part of the cylinder B, expands to a diameter equal or nearly so to the largest part of the pot A, forming a socket D, for the airtight condensing head E. The form of the inner or movable cylinder C, corresponds to the form of the cylinder B, its lower end being furnished with a tube $b$, to fit into the tube $a$, of the cylinder C, and its upper part being enlarged so as to fill out the upper enlarged portion of the cylinder B. Two metal strips $c$, are fastened to the upper part of the cylinder C, so as to form handles whereby said cylinder can be taken out or placed in. The lower part of the cylinder C, is packed so that it fits air tight into the stationary cylinder B, and fitted into the cylinder C, is the piston packed strainer F, constructed in every respect similar to the one described in my former patent. The handle $d$, of this strainer serves to adjust the same in the cylinder C, according to the quantity of water in the pot, so that in reality this strainer forms the adjustable bottom of the cylinder C. When the coffee is finished and if it is desired to remove the grindings this can now be done without danger of mixing some of it with the liquid coffee.

The upper part of the pot A, connects by means of a small tube $e$, with the spout G, and this tube extends up to the top of the spout, and it is covered up by the cap H, which covers the mouth of the spout. If it is desired to pour out some coffee therefore it is only necessary to take off the cap H, and the air has access to the interior of the pot through the tube $e$, so that the coffee flows from the spout without difficulty.

What I claim as new and desire to secure by Letters Patent is,

The arrangement of the movable cylinder C, in combination with the pot A, cylinder B, and piston packed strainer F, substantially as and for the purpose described.

WILLIAM CHESTERMAN.

Witnesses:
   CILO CHESTERMAN,
   W. H. EVANS.